United States Patent
Huang

(10) Patent No.: US 11,999,629 B2
(45) Date of Patent: Jun. 4, 2024

(54) CLEANING SACHET FOR REMOVING CARBON DEPOSIT AND RUST ON GUN, AND CLEANING METHOD THEREOF

(71) Applicant: Cheng-Chung Huang, Taoyuan (TW)

(72) Inventor: Cheng-Chung Huang, Taoyuan (TW)

( * ) Notice: Subject to any disclaimer, the term of this patent is extended or adjusted under 35 U.S.C. 154(b) by 115 days.

(21) Appl. No.: 17/858,963

(22) Filed: Jul. 6, 2022

(65) Prior Publication Data
US 2023/0026831 A1    Jan. 26, 2023

(30) Foreign Application Priority Data
Jul. 16, 2021  (TW) .................. 110126314

(51) Int. Cl.
  *C01F 7/02*  (2022.01)
  *C01G 9/02*  (2006.01)
  *F41A 29/00*  (2006.01)
  *B82Y 30/00*  (2011.01)

(52) U.S. Cl.
  CPC .................. *C01F 7/02* (2013.01); *C01G 9/02* (2013.01); *F41A 29/00* (2013.01); *B82Y 30/00* (2013.01); *C01P 2004/51* (2013.01); *C01P 2004/64* (2013.01)

(58) Field of Classification Search
  CPC ........ F41A 29/00–04; C01F 7/02; C01G 9/02; B82Y 30/00; C01P 2004/51; C01P 2004/64
  USPC ............................................................ 42/95
  See application file for complete search history.

(56) References Cited

U.S. PATENT DOCUMENTS

| | | | | |
|---|---|---|---|---|
| 2,464,730 A | * | 3/1949 | Sutherland | F41A 29/00 427/255.6 |
| 3,196,478 A | * | 7/1965 | Baymiller | A61Q 19/10 401/196 |
| 3,682,556 A | * | 8/1972 | Hanson | F41A 29/00 42/95 |
| 3,708,820 A | * | 1/1973 | Schultea | F41A 29/02 42/95 |
| 4,315,780 A | * | 2/1982 | Rupp | F41A 29/00 510/462 |

(Continued)

FOREIGN PATENT DOCUMENTS

| CN | 109280926 A | 1/2019 |
|---|---|---|
| CN | 109778212 A | 5/2019 |

(Continued)

*Primary Examiner* — Joshua E Freeman
*Assistant Examiner* — Benjamin S Gomberg
(74) *Attorney, Agent, or Firm* — CIPO IP Group

(57) ABSTRACT

A cleaning sachet for removing carbon deposit and rust on a gun element, and a cleaning method thereof, uses cleaning powder that includes aluminum oxide making up 75.000% to 99.989% by weight of the cleaning powder, zinc peroxide making up 0.010% to 9.000% by weight of the cleaning powder, and nano zinc oxide making up 0.001% to 6.000% by weight of the cleaning powder. A user can lay the cleaning sachet on a carbon-deposited and/or rusting area of the gun element before or after moistening the cleaning sachet with a lubricating oil, and then wipe the carbon-deposited and/or rusting area with the cleaning sachet after waiting a period of time. Therefore, the colloidal solution formed by mixing the lubricating oil and the cleaning powder and released out of the cleaning sachet can remove the carbon deposit and/or rust on the surface of the gun element.

16 Claims, 4 Drawing Sheets

(56) References Cited

U.S. PATENT DOCUMENTS

| | | | | |
|---|---|---|---|---|
| 4,482,469 A | * | 11/1984 | Plotze | C11D 7/3245 |
| | | | | 510/400 |
| 5,490,947 A | * | 2/1996 | Cioffe | C11D 3/3947 |
| | | | | 134/40 |
| RE46,065 E | * | 7/2016 | Crawford | F41A 29/04 |
| 2011/0146129 A1 | * | 6/2011 | Smith | B08B 1/00 |
| | | | | 42/95 |
| 2012/0272560 A1 | * | 11/2012 | Smith | F41A 29/00 |
| | | | | 977/734 |

FOREIGN PATENT DOCUMENTS

| | | |
|---|---|---|
| CN | 111002235 A | 4/2020 |
| CN | 111761417 A | 10/2020 |
| TW | M464456 U | 11/2013 |

\* cited by examiner

CLEANING SACHET FOR REMOVING CARBON DEPOSIT AND RUST ON GUN, AND CLEANING METHOD THEREOF

CROSS-REFERENCE TO RELATED PATENT APPLICATION

This non-provisional application claims priority to and the benefit of, under 35 U.S.C. § 119(a), Taiwan Patent Application No. 110126314, filed Jul. 16, 2021 in Taiwan. The entire content of the above identified application is incorporated herein by reference.

FIELD

The present disclosure is related to a cleaning sachet, and more particularly to a cleaning sachet having cleaning power that has aluminum oxide ($Al_2O_3$), zinc peroxide ($ZnO_2$) and nano zinc oxide, and can be dispersed in a lubricating oil to be released to the outer surface of the cleaning sachet, so as to soften carbon deposit and/or remove rust on a surface of a gun element.

BACKGROUND

Guns can be generally divided into rifles, machine guns, handguns, cannons, naval artillery, and so on. The firing principle of a gun-type weapon consists in a bolt striking a gunpowder-loaded bullet such that the gunpowder explodes in the bore of the gun barrel and thereby propels the bullet out of the barrel. Once the bullet is fired, chemical substances formed by combustion of the gunpowder (e.g., potassium chloride, commonly known as "carbon deposit") are left in the bore. These chemical substances will absorb moisture in the air, so if a gun user fails to clean, and perform maintenance work on, the bore properly after using the gun, the bore will rust over time and become pitted.

When pitting occurs in the bore of a gun barrel, the oxidized crystals accumulating on the bore surface may have a negative effect on ballistic precision or the smoothness of firing, if not causing a bullet to get stuck in the barrel. Should the gunpowder in a bullet explode in the bore of a gun barrel without the bullet being fired (which phenomenon is generally referred to as a "bore burst"), the gun may be destroyed by the explosion, with the broken pieces of the gun flying outward forcibly, causing injury or death. It can be known from the above that the cleaning and maintenance of guns are important issues that gun users must take seriously.

Generally, when there is rust or carbon deposit on the bore surface of a gun barrel, a piece of gun wiping cloth is insufficient to clean the bore surface thoroughly. Most gun users, therefore, would try to insert a scraper or a brush with hard bristles (e.g., a copper bristle brush) into the bore in order to scrape or brush off the rust or carbon deposit on the bore surface. While rust and carbon deposit can be removed by this scraping or brushing approach, the bore surface, or more particularly the chromium coating thereon, is likely to be scratched during the cleaning process such that the anti-rusting property of the bore is greatly reduced, and this creates a vicious cycle. After long-term use, the bore surface will rust away so badly that the gun cannot but be scrapped, which leads to a financial loss in relation to armament.

In light of the above, the traditional cleaning and maintenance tools for guns not only are inconvenient to use and have a limited cleaning effect, but also may scratch the bore surface of a gun barrel and cause irrevocable damage. One of the issues to be addressed in the present disclosure is to solve the aforesaid issues effectively and provide better user experience.

SUMMARY

In view of the fact that the conventional tools and methods for removing the rust or carbon deposit on a gun still have inadequacies in use, as a result of years of practical professional experience in design, processing, and manufacture; a research spirit of persistent improvement; and extensive research and repeated experiments, the present disclosure provides a cleaning sachet for removing the carbon deposit and/or rust on a gun and the cleaning method of the cleaning sachet, which mitigates the aforesaid inadequacies effectively and provides better user experience.

One aspect of the present disclosure is directed to a cleaning sachet for removing carbon deposit and/or rust on a gun element. The cleaning sachet includes cleaning powder and a sachet body. The cleaning powder includes aluminum oxide ($Al_2O_3$) that makes up 75.000% to 99.989% by weight of the cleaning powder; zinc peroxide ($ZnO_2$) that makes up 0.010% to 9.000% by weight of the cleaning powder; and nano zinc oxide that makes up 0.001% to 6.000% by weight of the cleaning powder. The sachet body is made at least of a porous fiber material, and formed therein with a receiving space for accommodating the cleaning powder, and allows a lubricating oil to enter the receiving space through the sachet body so that the cleaning powder is dispersed in the lubricating oil and a part of the cleaning powder dispersed in the lubricating oil is released to an outer surface of the sachet body. Accordingly, through the cleaning powder and the colloidal solution fainted by mixing the lubricating oil with the cleaning powder, carbon deposit and/or rust on a surface of a gun element can be cleaned, with the surface being protected from damage.

In certain embodiments, the aluminum oxide has an average particle size ranging from 15 nm to 25 nm, the nano zinc oxide has an average particle size ranging from 1 nm to 100 nm, and the zinc peroxide has an aerodynamic diameter ranging from 5 $g/cm^3$ to 6 $g/cm^3$.

In certain embodiments, the sachet body is made of a non-woven fabric.

In certain embodiments, the cleaning powder further includes calcium oxide (CaO), ferric oxide ($Fe_2O_3$), potassium oxide ($K_2O$), and titanium dioxide ($TiO_2$), the aluminum oxide constitutes 80% to 85% by weight of the cleaning powder, the zinc peroxide constitutes 7% to 9% by weight of the cleaning powder, the nano zinc oxide constitutes 5% to 6% by weight of the cleaning powder, and the calcium oxide, the ferric oxide, the potassium oxide, and the titanium dioxide jointly constitute a remaining percentage by weight of the cleaning powder.

In certain embodiments, the aluminum oxide includes powder of at least two different particle sizes, and a weight ratio of relatively large-particle-size aluminum oxide powder to relatively small-particle-size aluminum oxide powder ranges from 1:10 to 1:12.

In certain embodiments, the relatively large-particle-size aluminum oxide powder has an average particle size greater than 20 nm, and the relatively small-particle-size aluminum oxide powder has an average particle size less than 20 nm.

Another aspect of the present disclosure is directed to a method for removing carbon deposit and/or rust on a gun element by a cleaning sachet. The cleaning sachet includes cleaning powder and a sachet body. The cleaning powder includes aluminum oxide ($Al_2O_3$) making up 75.000% to 99.989% by weight of the cleaning powder, zinc peroxide ($ZnO_2$) making up 0.010% to 9.000% by weight of the cleaning powder, and nano zinc oxide making up 0.001% to 6.000% by weight of the cleaning powder. The sachet body is made at least of a porous fiber material, and formed therein with a receiving space for accommodating the cleaning powder, and allows a lubricating oil to enter the receiving space through the sachet body so that the cleaning powder is dispersed in the lubricating oil and a part of the cleaning powder dispersed in the lubricating oil is released to an outer surface of the sachet body. The method includes: laying the cleaning sachet on a carbon-deposited area or a rusting area of the gun element; moistening the cleaning sachet with the lubricating oil; waiting a period of time; and wiping the carbon-deposited or rusting area with the cleaning sachet.

In certain embodiments, the step of laying the cleaning sachet on the carbon-deposited area or the rusting area of the gun element precedes the step of moistening the cleaning sachet with the lubricating oil.

In certain embodiments, the step of moistening the cleaning sachet with the lubricating oil precedes the step of laying the cleaning sachet on the carbon-deposited area or the rusting area of the gun element.

In certain embodiments, a weight ratio of the lubricating oil to the cleaning powder ranges from 1:1 to 20:1.

In certain embodiments, the period of time is 5 to 10 minutes.

In certain embodiments, as used in the method, the aluminum oxide has an average particle size ranging from 15 nm to 25 nm, the nano zinc oxide has an average particle size ranging from 1 nm to 100 nm, and the zinc peroxide has an aerodynamic diameter ranging from 5 $g/cm^3$ to 6 $g/cm^3$.

In certain embodiments, as used in the method, the sachet body is made of a non-woven fabric.

In certain embodiments, as used in the method, the cleaning powder further includes calcium oxide (CaO), ferric oxide ($Fe_2O_3$), potassium oxide ($K_2O$), and titanium dioxide ($TiO_2$), the aluminum oxide constitutes 80% to 85% by weight of the cleaning powder, the zinc peroxide constitutes 7% to 9% by weight of the cleaning powder, the nano zinc oxide constitutes 5% to 6% by weight of the cleaning powder, and the calcium oxide, the ferric oxide, the potassium oxide, and the titanium dioxide jointly constitute a remaining percentage by weight of the cleaning powder.

In certain embodiments, as used in the method, the aluminum oxide includes powder of at least two different particle sizes, and a weight ratio of relatively large-particle-size aluminum oxide powder to relatively small-particle-size aluminum oxide powder ranges from 1:10 to 1:12.

In certain embodiments, as used in the method, the relatively large-particle-size aluminum oxide powder has an average particle size greater than 20 nm, and the relatively small-particle-size aluminum oxide powder has an average particle size less than 20 nm.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
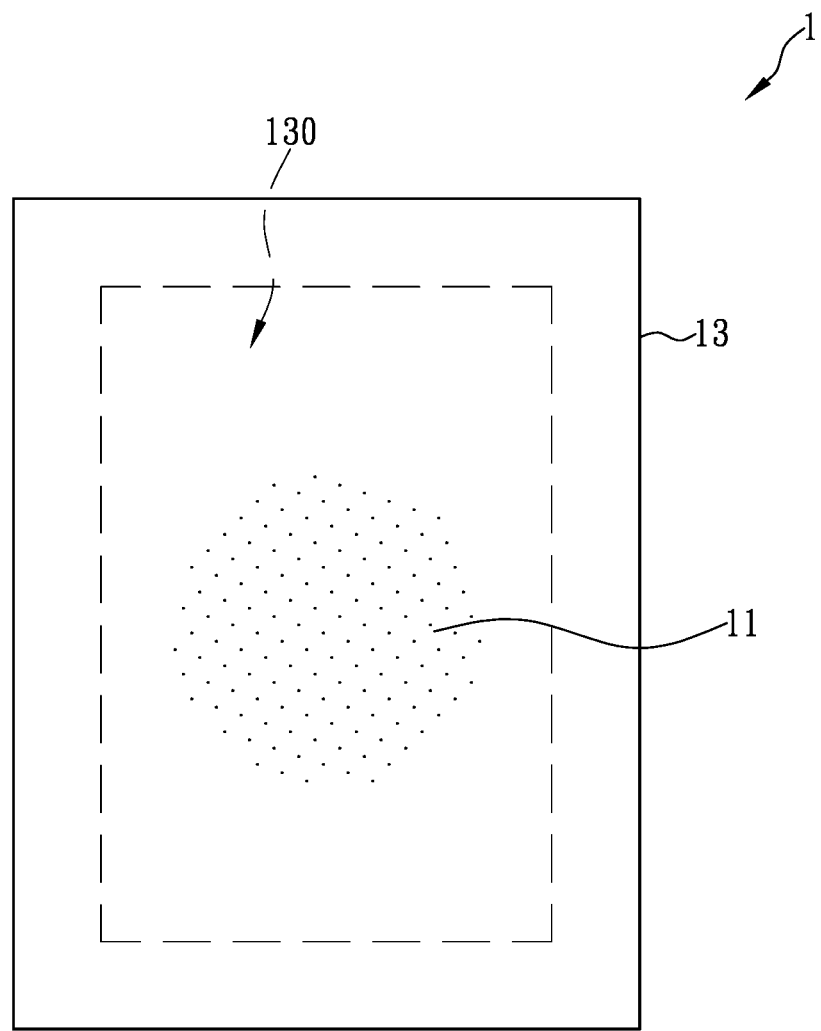
FIG. 1 is a schematic diagram of a cleaning sachet according to certain embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like.

The present disclosure provides a cleaning sachet for removing the carbon deposit and/or rust on a gun and the cleaning method of the cleaning sachet. In certain embodiments, referring to FIG. 1, the cleaning sachet 1 includes cleaning powder 11 and a sachet body 13. The sachet body 13 can be made of a non-woven fabric or a woven fabric, and the material of the non-woven or woven fabric may be natural fiber (e.g., cotton, linen) or synthetic fiber (e.g., plastic fiber). The sachet body 13 is formed therein with a receiving space 130, and the receiving space 130 is designed to accommodate the cleaning powder 11. The sachet body 13 is also formed with a plurality of mesh openings. When a user applies a liquid lubricating oil (e.g., a 3M lubricating oil, a gun cleaning oil, a motor oil, or the like) to the surface of the sachet body 13 in drops, the lubricating oil can enter the receiving space 130 of the sachet body 13 through the mesh openings and mix with the cleaning powder 11 such that the cleaning powder 11 is blended with and dispersed in the lubricating oil. Once the cleaning powder 11 and the lubricating oil form an emulsion-like colloidal solution, some of the colloidal solution will be released out of the sachet body 13; as a result, some of the cleaning powder 11 is released to the outer surface of the sachet body 13. It is noted that the term "lubricating oil" is used herein to refer to an oily liquid containing a base stock or base oil, wherein the base stock or base oil may be, but not limited to, a product of fractional distillation of an oil refinery (i.e., a mineral oil, with a boiling point higher than those of heavy oils for use as fuels and lower than that of asphalt) or a synthetically prepared product (i.e., a synthetic oil).

With continued reference to FIG. 1, the cleaning powder 11 at least includes aluminum oxide ($Al_2O_3$), zinc peroxide ($ZnO_2$), and nano zinc oxide, with the aluminum oxide making up 75.000% to 99.989% by weight of the cleaning powder 11, the zinc peroxide making up 0.010% to 9.000% by weight of the cleaning powder, and the nano zinc oxide making up 0.001% to 6.000% by weight of the cleaning powder. The particle size of the nano zinc oxide is smaller than the particle size of the zinc peroxide. In certain embodiments, the nano zinc oxide has an average particle size ranging from 1 nm to 100 nm, the zinc peroxide has an aerodynamic diameter ranging from 5 $g/cm^3$ to 6 $g/cm^3$, and the aluminum oxide has an average particle size ranging from 15 nm to 25 nm. The nano zinc oxide, whose particle size is in the nanoscale, exhibits a change in characteristics in comparison with non-nanoscale zinc oxide (i.e., has characteristics that non-nanoscale zinc oxide does not possess) due to the size-dependent properties. Accordingly, the cleaning powder 11 includes the nano zinc oxide in addition to the aluminum oxide and the zinc peroxide in order to soften carbon deposit and remove rust.

Figure 2:
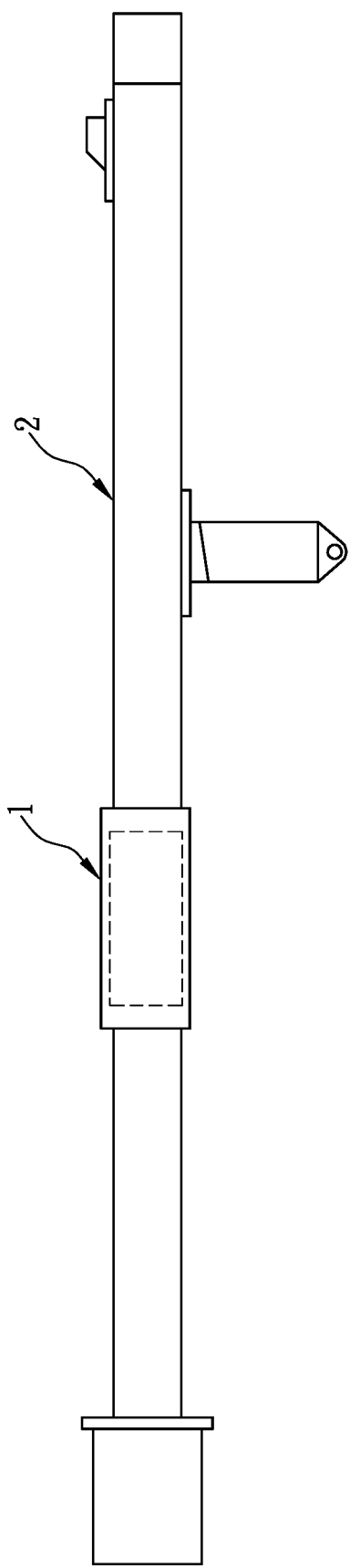
FIG. 2 is a schematic diagram of the cleaning sachet being laid on a gun element according to certain embodiments of the present disclosure.
Figure 3:
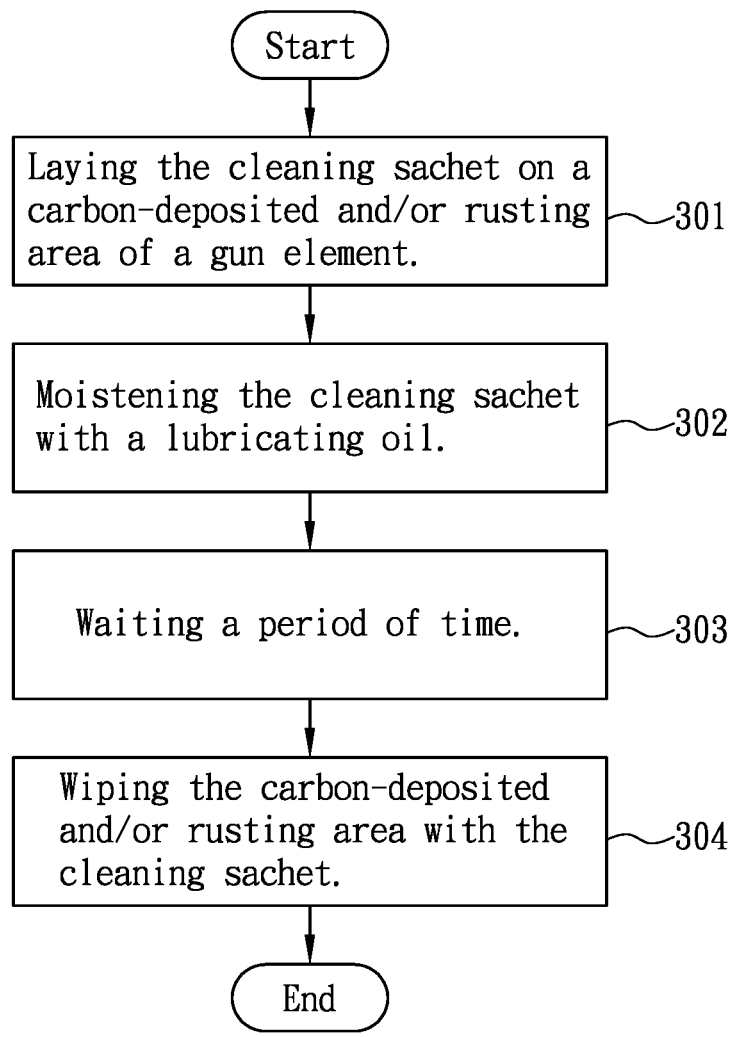
FIG. 3 is a flowchart of a cleaning method according to certain embodiments of the present disclosure.

Referring to FIG. 2 and FIG. 3, the present disclosure provides a cleaning method that includes the following steps. To start with, a user of the cleaning sachet 1 lays the cleaning sachet 1 on a carbon-deposited and/or rusting area of a gun element 2 (e.g., a gun barrel) (step 301). For example, the cleaning sachet 1 is placed on the outer surface of the barrel and then tied tightly in place with an elastic string, or the cleaning sachet 1 is mounted on a gun cleaning rod and then inserted into the bore of the barrel along with the gun cleaning rod. Then, a lubricating oil is applied to the cleaning sachet 1, for example, in drops (step 302), with the amount of the lubricating oil sufficient to form an emulsion-like colloidal solution after the lubricating oil is mixed with the cleaning powder 11, and to allow the colloidal solution to be released out of the cleaning sachet 1 and contact the carbon-deposited and/or rusting area of the gun element. By varying the amount of the lubricating oil, the cleaning powder 11 can be rendered into colloidal solutions of different hardnesses. In certain embodiments, the weight ratio of the lubricating oil to the cleaning powder 11 can range from 1:1 to 20:1 (but is not limited to this range). Moreover, after applying the lubricating oil to the cleaning sachet 1 in drops, the user may rub the cleaning sachet 1 to accelerate the mixing between the cleaning powder 11 and the lubricating oil and hence the formation of an emulsion-like colloidal solution. In certain embodiments, the order of step 301 and step 302 may be exchanged; that is to say, a user can moisten the cleaning sachet 1 with a lubricating oil before laying the cleaning sachet 1 on the gun element 2. For example, the user can first apply a lubricating oil to the cleaning sachet 1 in drops, then mount the cleaning sachet 1 at the front end of a gun cleaning rod, and then insert the gun cleaning rod into the bore of a gun barrel.

With continued reference to FIG. 2 and FIG. 3, the user can wait a period of time (e.g., 5 to 10 minutes) (step 303) so that some of the lubricating oil and some of the cleaning powder 11 cover and infiltrate the carbon-deposited and/or rusting area of the gun element 2 to soften the carbon deposit and/or rust. Following that, the user wipes the carbon-deposited and/or rusting area with the cleaning sachet 1 (step 304) to further soften, destroy, decompose, and remove the carbon deposit and/or rust, and to polish the surface of the gun element 2, thereby restoring the luster of the chromium coating on the gun element 2, i.e., the clean and glossy surface of the gun element 2, and reducing the chance of having a bore burst. Moreover, in the course in which the cleaning sachet 1 is used to wipe the carbon-deposited and/or rusting area, the colloidal solution in the sachet body 13 is squeezed and therefore keeps seeping out of the sachet body 13 to ensure that the carbon deposit and/or rust is continuously removed by the ingredients of the cleaning powder 11. As the hardness of the zinc peroxide and of the nano zinc oxide (about 2.5 on the Mohs hardness scale) is lower than that of the aluminum oxide (about 9 on the Mohs hardness scale), a small amount of the zinc peroxide and nano zinc oxide can function as buffer particles while the carbon-deposited and/or rusting area is wiped with the cleaning sachet 1, i.e., while the carbon deposit and/or rust is ground and removed by the aluminum oxide. The buffer particles help prevent the cleaning powder 11 from damaging the surface of the gun element 2.

In order for the cleaning sachet 1 to have even better grinding and cleaning abilities for effective removal of carbon deposit and rust, the aluminum oxide in certain embodiments includes powder of at least two different particle sizes, with the weight ratio of the relatively large-particle-size aluminum oxide powder to the relatively small-particle-size aluminum oxide powder ranging from 1:10 to 1:12, the relatively large-particle-size aluminum oxide powder having an average particle size greater than 20 nm, and the relatively small-particle-size aluminum oxide powder having an average particle size less than 20 nm. The relatively large aluminum oxide particles can remove carbon deposit and rust effectively, while the relatively small aluminum oxide particles can produce a polishing effect to restore the cleanliness and gloss of the surface of the gun element 2, in addition to removing carbon deposit and rust.

In certain embodiments, the cleaning powder 11 further includes calcium oxide (CaO), ferric oxide ($Fe_2O_3$), potassium oxide ($K_2O$), and titanium dioxide ($TiO_2$). Experiments and tests according to the present disclosure have shown that the cleaning powder 11 can be more effective in removing carbon deposit and rust and hence in extending the service life of the gun element 2 by having the foregoing ingredients in the following ratios: the aluminum oxide constituting 80% to 85% by weight of the cleaning powder 11, the zinc peroxide constituting 7% to 9% by weight of the cleaning powder 11, the nano zinc oxide constituting 5% to 6% by weight of the cleaning powder 11, and the calcium oxide, the ferric oxide, the potassium oxide, and the titanium dioxide jointly constituting the remaining percentage by weight of the cleaning powder 11.

Figure 4:
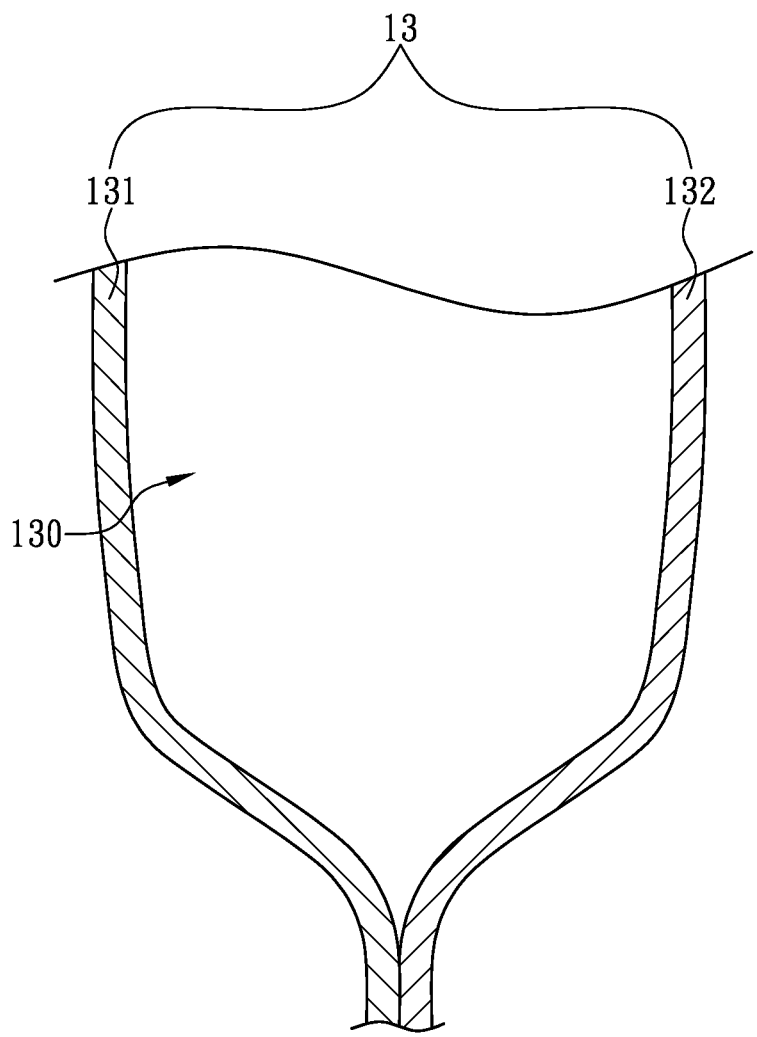
FIG. 4 is a cross-sectional view of a part of a sachet body formed by a first sheet and a second sheet.

Referring again to FIG. 1, the sachet body 13 in certain embodiments can be formed by folding a single sheet of fabric and sealing the periphery of the folded sheet, or as in certain embodiments shown in FIG. 4, by superposing a first sheet 131 on a second sheet 132 and sealing the periphery of the sheets. The first sheet 131 and the second sheet 132 may both be made of a non-woven or woven fabric, or the first sheet 131 is made of a non-woven or woven fabric while the second sheet 132 is made of a plastic material (e.g., polyethylene or polyvinyl chloride). In the latter case, one can use the cleaning sachet 1 by first applying a lubricating oil to the first sheet 131 in drops, then laying the cleaning sachet 1 on the gun element 2 in such a way that the first sheet 131 covers the carbon-deposited and/or rusting area, and after the lapse of the period of time, wiping the carbon-deposited and/or rusting area with the cleaning sachet 1. As the second sheet 132 faces away from the gun element 2, the user can hold the cleaning sachet 1 by the second sheet 132 when performing the cleaning operation, without having to worry about touching the emulsion-like colloidal solution and having an uncomfortable oily tactile sensation.

It can be known from the above that the cleaning sachet 1 and the ingredients of its contents can soften carbon deposit and remove rust effectively, thereby protecting the gun element 2 from damage by rust and from having a pitted bore. In addition, before the cleaning sachet 1 is used for cleaning, only the dry cleaning powder 11 is in the cleaning sachet 1. The cleaning sachet 1, therefore, will not harden or deteriorate when stored in a region with cold or even snowy winters. Test results according to the present disclosure have shown that the cleaning sachet 1 and the cleaning powder 11 therein can be stored at temperatures ranging from 70° C. to −25° C. without hardening or deterioration. Furthermore, as the cleaning sachet is used in conjunction with a lubricating oil, some of the lubricating oil can serve a gun maintenance and anti-rusting function after the cleaning operation is completed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A cleaning sachet for removing at least one of carbon deposit and rust on a gun element, comprising:
   cleaning powder, comprising:
      aluminum oxide ($Al_2O_3$), making up 75.000% to 99.989% by weight of the cleaning powder;
      zinc peroxide ($ZnO_2$), making up 0.010% to 9.000% by weight of the cleaning powder; and
      nano zinc oxide, making up 0.001% to 6.000% by weight of the cleaning powder; and
   a sachet body, made at least of a porous fiber material, formed therein with a receiving space for accommodating the cleaning powder, and configured to allow a lubricating oil to enter the receiving space through the sachet body so that the cleaning powder is dispersed in the lubricating oil and a part of the cleaning powder dispersed in the lubricating oil is released to an outer surface of the sachet body.

2. The cleaning sachet according to claim 1, wherein the aluminum oxide has an average particle size ranging from 15 nm to 25 nm, the nano zinc oxide has an average particle size ranging from 1 nm to 100 nm, and the zinc peroxide has an aerodynamic diameter ranging from 5 $g/cm^3$ to 6 $g/cm^3$.

3. The cleaning sachet according to claim 1, wherein the sachet body is made of a non-woven fabric.

4. The cleaning sachet according to claim 1, wherein the cleaning powder further comprises calcium oxide (CaO), ferric oxide ($Fe_2O_3$), potassium oxide ($K_2O$), and titanium dioxide ($TiO_2$), the aluminum oxide constitutes 80% to 85% by weight of the cleaning powder, the zinc peroxide constitutes 7% to 9% by weight of the cleaning powder, the nano zinc oxide constitutes 5% to 6% by weight of the cleaning powder, and the calcium oxide, the ferric oxide, the potassium oxide, and the titanium dioxide jointly constitute a remaining percentage by weight of the cleaning powder.

5. The cleaning sachet according to claim 1, wherein the aluminum oxide includes powder of at least two different particle sizes, and a weight ratio of relatively large-particle-size aluminum oxide powder to relatively small-particle-size aluminum oxide powder ranges from 1:10 to 1:12.

6. The cleaning sachet according to claim 5, wherein the relatively large-particle-size aluminum oxide powder has an average particle size greater than 20 nm, and the relatively small-particle-size aluminum oxide powder has an average particle size less than 20 nm.

7. A method for removing at least one of carbon deposit and rust on a gun element by a cleaning sachet, wherein the cleaning sachet comprises cleaning powder and a sachet body, the cleaning powder comprises aluminum oxide ($Al_2O_3$) making up 75.000% to 99.989% by weight of the cleaning powder, zinc peroxide ($ZnO_2$) making up 0.010% to 9.000% by weight of the cleaning powder, and nano zinc oxide making up 0.001% to 6.000% by weight of the cleaning powder, and the sachet body is made at least of a porous fiber material, formed therein with a receiving space for accommodating the cleaning powder, and configured to allow a lubricating oil to enter the receiving space through the sachet body so that the cleaning powder is dispersed in the lubricating oil and a part of the cleaning powder dispersed in the lubricating oil is released to an outer surface of the sachet body, the method comprising:
   laying the cleaning sachet on a carbon-deposited area or a rusting area of the gun element;
   moistening the cleaning sachet with the lubricating oil;
   waiting a period of time; and
   wiping the carbon-deposited or rusting area with the cleaning sachet.

8. The method according to claim 7, wherein the step of laying the cleaning sachet on the carbon-deposited area or the rusting area of the gun element precedes the step of moistening the cleaning sachet with the lubricating oil.

9. The method according to claim 7, wherein the step of moistening the cleaning sachet with the lubricating oil precedes the step of laying the cleaning sachet on the carbon-deposited area or the rusting area of the gun element.

10. The method according to claim 7, wherein a weight ratio of the lubricating oil to the cleaning powder ranges from 1:1 to 20:1.

11. The method according to claim 7, wherein the period of time is 5 to 10 minutes.

12. The method according to claim 7, wherein the aluminum oxide has an average particle size ranging from 15 nm to 25 nm, the nano zinc oxide has an average particle size ranging from 1 nm to 100 nm, and the zinc peroxide has an aerodynamic diameter ranging from 5 $g/cm^3$ to 6 $g/cm^3$.

13. The method according to claim 7, wherein the sachet body is made of a non-woven fabric.

14. The method according to claim 7, wherein the cleaning powder further comprises calcium oxide (CaO), ferric oxide ($Fe_2O_3$), potassium oxide ($K_2O$), and titanium dioxide ($TiO_2$), the aluminum oxide constitutes 80% to 85% by weight of the cleaning powder, the zinc peroxide constitutes 7% to 9% by weight of the cleaning powder, the nano zinc oxide constitutes 5% to 6% by weight of the cleaning powder, and the calcium oxide, the ferric oxide, the potassium oxide, and the titanium dioxide jointly constitute a remaining percentage by weight of the cleaning powder.

15. The method according to claim 7, wherein the aluminum oxide includes powder of at least two different particle sizes, and a weight ratio of relatively large-particle-size aluminum oxide powder to relatively small-particle-size aluminum oxide powder ranges from 1:10 to 1:12.

16. The method according to claim 15, wherein the relatively large-particle-size aluminum oxide powder has an average particle size greater than 20 nm, and the relatively small-particle-size aluminum oxide powder has an average particle size less than 20 nm.

* * * * *